United States Patent [19]

Sussman

[11] 4,002,406
[45] Jan. 11, 1977

[54] MICROSCOPE CONDENSER
[75] Inventor: Milton H. Sussman, Amherst, N.Y.
[73] Assignee: American Optical Corporation, Southbridge, Mass.
[22] Filed: Dec. 8, 1975
[21] Appl. No.: 638,486
[52] U.S. Cl. .................. 350/189; 350/175 ML; 350/231
[51] Int. Cl.² .................. G02B 9/06; G02B 21/02; G02B 13/18
[58] Field of Search ........... 350/189, 231, 175 ML
[56] References Cited
UNITED STATES PATENTS

| | | | |
|---|---|---|---|
| 3,355,234 | 11/1967 | Muller | 350/175 ML |
| 3,598,474 | 8/1971 | Shoemaker | 350/175 ML |

*Primary Examiner*—John K. Corbin
*Assistant Examiner*—Conrad Clark
*Attorney, Agent, or Firm*—Alan H. Spencer; William C. Nealon; H. R. Berkenstock, Jr.

[57] ABSTRACT

A microscope condenser of the Abbe type has the optical characteristics of the biconvex singlet followed by the convex-plano singlet improved by making the first surface of the biconvex singlet aspherical. The aspherical surface substantially reduces spherical aberration and coma as well as pupillary aberration of the condenser.

2 Claims, 1 Drawing Figure

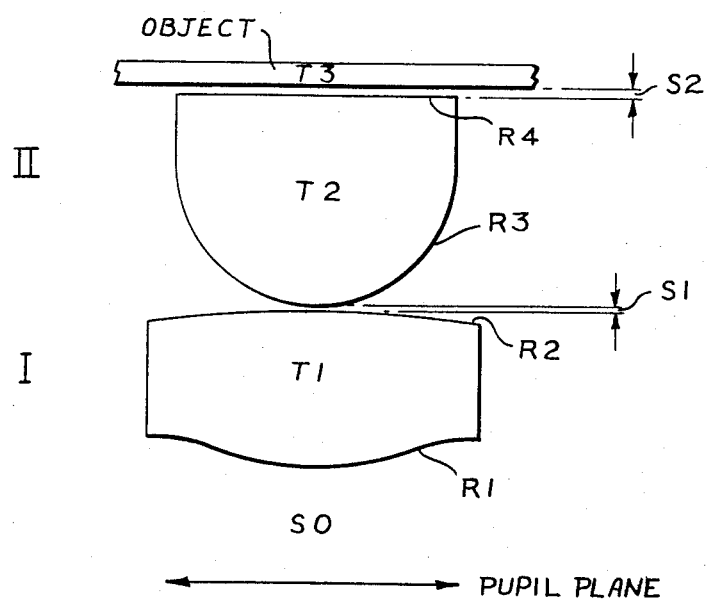

MICROSCOPE CONDENSER

BACKGROUND OF THE INVENTION

This invention relates to microscope condensers and in particular to microscope condensers of the Abbe type significantly improved by making the first surface of the biconvex singlet aspherical.

Abbe condensers are well known and conventionally have a biconvex singlet as the first element and a convex-plano singlet as the second element. However, the first and second elements have normaly been produced with spherical surfaces. Thus, although inexpensive because of their simplicity, Abbe condensers inherently have a significant amount of spherical aberration and coma as well as pupillary aberration.

It is an object of the present invention to provide an improved Abbe condenser.

It is another object of the present invention to provide an Abbe condenser with substantially reduced spherical aberration, coma and pupillary aberration.

It is an object of the present invention to provide an Abbe condenser having a biconvex singlet, with an aspherical first surface and a convex-plano singlet.

It is still further an object of the present invention to provide an Abbe condenser overcoming the disadvantages of the prior art noted above.

BREIF DESCRIPTION OF THE PRESENT INVENTION AND DRAWINGS

Improved Abbe condensers of the present invention have two components, a biconvex singlet and a convex-plano singlet, with the first surface of the biconvex singlet being aspherical. The improved condensers have excellent correction for coma, spherical aberration and pupillary aberration.

FIG. 1 is an optical diagram of an embodiment of the present invention.

DESCRIPTION OF THE PREFERRED EMBODIMENT

The condenser, as shown in FIG. 1, has a numerical aperture of approximately 0.90, excellent correction for spherical aberration, coma and pupillary aberration. Referring to FIG. 1, a biconvex positive singlet I and a convex-plano positive singlet II are axially aligned. The pupil plane of the condenser system is external to the glass and the spacing between the plano surface of the last element and the object slide permit either oil or air to fill the space.

Lens parameters are given in Table I with lens radii designated as $R_1$ to $R_4$, a minus sign (−) indicates the center of curvature on the pupil side of the lens, thicknesses are designated $T_1$ to $T_3$, spacings are designated $S_0$ to $S_2$, indices of refraction are designated $ND_1$ to $ND_3$ and Abbe numbers are designated $\nu_1$ to $\nu_3$. X is a variable having a value of about 9 to 11mm.

TABLE I

| Lens | Radius | Thickness | Spacing | Index of Refraction | Abbe Number |
|---|---|---|---|---|---|
| | | | $S_0=0.5828X$ | | |
| I | $R_1=1.4794X$ | $T_1=0.7869X$ | | $1.522<ND_1<1.524$ | $\nu_1\cong58$ |
| | $R_2=-6.5954X$ | | | | |
| | | | $S_1=0.0095X$ | | |
| II | $R_3=0.7313X$ | $T_2=1.0618X$ | | $1.522<ND_2<1.524$ | $\nu_2\cong58$ |
| | $R_4=\infty$ | | | | |
| | | | $S_2=0.0381X$ | | |
| | | $T_3=0.1190X$ | | $1.524<ND_3<1.525$ | $\nu_3\cong58$ | wherein X is 9 to 11mm. The front surface of lens I, with radius $R_1$, is an axially symmetrical aspheric surface with axis of rotation Z. The value of Z, for any given value of $x$ and $y$ is defined by the equation:

$$Z = \frac{cp^2}{1+\sqrt{1-(k+1)c^2p^2}} + dp^4 + ep^6 + fp^8 + gp^{10}$$

Wherein:
$d=+0.229394 \cdot 10^{-6}$
$e=-0.906333 \cdot 10^{-7}$
$f=+0.105699 \cdot 10^{-8}$
$g=-0.139724 \cdot 10^{-10}$
$p^2=x^2+y^2$
$c=1/R_1$, and
$k=-1.0$ $T_3$, $ND_3$ and $\nu_3$, given in the above Table, are representative of conventional microscope slides. While illustrated in the drawing and defined in the Table, the slide does not form a part of the present invention. Those skilled in the art can easily adapt the condenser system to a slide of unusual thickness or having an unusual index of refraction and Abbe number.

A preferred embodiment, where X is 10.5mm, has the following parameters:

TABLE II

| Lens | Radius | Thickness | Spacing | Index of Refraction | Abbe Number |
|---|---|---|---|---|---|
| | | | $S_0=6.12$ | | |
| | *$R_1=15.534$ | $T_1=8.263$ | | $ND_1=1.523$ | $\nu_1=58.6$ |
| | $R_2=-69.252$ | | | | |
| | | | $S_1=0.10$ | | |
| | $R_3=7.679$ | $T_2=11.149$ | | $ND_2=1.523$ | $\nu_2=58.6$ |
| | $R_4=\infty$ | | | | |
| | | | $S_2=0.40$ | | |

TABLE II-continued

| Lens | Radius | Thickness | Spacing | Index of Refraction | Abbe Number |
|---|---|---|---|---|---|
| | | $T_3 = 1.250$ | | $ND_3 = 1.5244$ | $\nu_3 = 58.3$ |

*Aspheric surface having conic coefficient and four deformation coefficients given above.

What is claimed is:

1. An improved microscope condenser having a front focal plane external to the glass comprising, in sequence, a bioconvex positive singlet I and a convex-plano positive singlet II aligned along an optical axis, which singlets have parameters of lens radii (R), and minus sign (−) indicates center of curvature on the pupil side of the lens, thickness (T), spacing (S), index of refraction (ND and Abbe number ($\nu$) as follows:

| Lens | Radius | Thickness | Spacing | Index of Refraction | Abbe Number |
|---|---|---|---|---|---|
| | | | $S_0 = 0.5828X$ | | |
| I | $R_1 = 1.4794X$ | $T_1 = 0.7869X$ | | $1.522 < ND_1 < 1.524$ | $\nu_1 \cong 58$ |
| | $R_2 = -6.5954X$ | | $S_1 = 0.0095X$ | | |
| II | $R_3 = 0.7313X$ | $T_2 = 1.0618X$ | | $1.522 < ND_2 < 1.524$ | $\nu_2 \cong 58$ |
| | $R = \infty$ | | $S_2 = 0.0381X$ | | | wherein X is 9 to 11mm, the surface having radius $R_1$ is axially symmetrical aspherical with a conic coefficient ($k$) of −1.0 and deformation coefficients d of $+0.229394 \cdot 10^{-6}$, e of $-0.906333 \cdot 10^{-7}$, f of $+0.105699 \cdot 10^{-8}$ and g of $-0.139724 \cdot 10^{-10}$ 2. The condenser of claim 1 wherein X is 10.5mm, $ND_1$ is 1.523, $ND_2$ is 1.523, $\nu_1$ is 58.6 and $\nu_2$ is 58.6.

* * * * *